United States Patent [19]
Juncker et al.

[11] Patent Number: 5,983,755
[45] Date of Patent: Nov. 16, 1999

[54] CHAIN SAW SHARPENING APPARATUS WITH UNIQUE DISASSEMBLY FEATURE

[75] Inventors: Clarence A. Juncker, Mt. Vernon; David L. Juncker, New Harmony, both of Ind.

[73] Assignee: AgTracks, Inc., Mt. Vernon, Ind.

[21] Appl. No.: 09/079,582

[22] Filed: May 15, 1998

[51] Int. Cl.⁶ ................................................. B23D 63/16
[52] U.S. Cl. ........................................................ 76/80.5
[58] Field of Search ............................. 76/25.1, 36, 37, 76/31, 80.5; 451/364

[56] References Cited

U.S. PATENT DOCUMENTS 3,744,349  7/1973  Juncker ................................. 76/31 X
4,677,881  7/1987  Jorde ..................................... 76/37 X Primary Examiner—Douglas D. Watts
Attorney, Agent, or Firm—Jansson, Shupe, Bridge & Munger, Ltd.

[57] ABSTRACT

An apparatus for sharpening a chain saw includes a frame, a file guide carriage having at least one guide bore capable of receiving a file therethrough, and a guide bar attached to the frame. The file guide carriage is mounted with respect to the frame so as to allow for sliding movement along an axis and an elongate opening in the carriage is coincident with the axis. The improvement includes at least one easy-to-remove adjustment screw that has spaced-apart inward and outward bearing surfaces threaded into the elongate opening. A bearing member extends from the guide bar and is interposed between the bearing surfaces. This bearing member includes a first aperture aligned with the axis and having a first diameter that allows for the receiving of the adjustment screw, and a second aperture overlapping the first aperture and having a second diameter greater than the first diameter.

8 Claims, 5 Drawing Sheets

CHAIN SAW SHARPENING APPARATUS WITH UNIQUE DISASSEMBLY FEATURE

FIELD OF INVENTION

This invention relates generally to sharpening devices and, more particularly, to a sharpening device for a chain saw.

BACKGROUND OF THE INVENTION

A chain saw sharpener and its operation are disclosed in U.S. Pat. No. 3,744,349 (Junker). Although useful, the disclosed sharpener is difficult to clean and maintain in that it is not easily disassembled into its various components. This is because the file guide carriage is held in position and adjusted by the use of two adjustment screws that themselves are secured to a guide bar through the use of collars positioned between the guide bar and the carriage. Since the collars are difficult to remove, it is burdensome (and, some would say, frustrating) to disassemble the sharpener in order to remove foreign material such as dirt, sawdust, and wood chips that may have collected in the sharpener and which may hinder operation.

U.S. Pat. No. 4,677,881 (Jorde) discloses an adjustment screw that requires the use of either a retaining ring and thrust washer or a transverse locking pin to hold the screw in position. Retainers of this type make it difficult to remove the adjustment screw and thus disassemble the sharpener.

Because both chain saws and chain saw sharpeners are used in an outdoor environment where they are constantly exposed to dirt and grime, an improved chain saw sharpener which is easy to disassemble and clean would be an important advancement in the art.

OBJECTS OF THE INVENTION

An object of the invention is to provide an improved chain saw sharpener that overcomes some of the problems and shortcomings of the prior art.

Another object of the invention is to provide an improved chain saw sharpener that can be readily disassembled into its various components, thereby allowing easy cleaning. How these and other objects are accomplished will become apparent from the following descriptions and from the drawings.

SUMMARY OF THE INVENTION

The invention involves an improvement to an apparatus for sharpening a chain saw where the apparatus includes a frame, a file guide carriage, having at least one guide bore capable of receiving a file therethrough, and a guide bar attached to the frame. The file guide carriage is mounted with respect to the frame so as to allow for sliding movement along an axis that has an elongate opening coincident with the axis.

The improvement includes a first adjustment screw that has spaced-apart inward and outward first bearing surfaces threaded into the elongate opening. A first bearing member extends from the guide bar and is interposed between the first bearing surfaces. This bearing member includes a first aperture aligned with the axis and having a first diameter that receives the first adjustment screw, and a second aperture overlapping the first aperture and having a second diameter greater than the first diameter.

In one particular embodiment of the invention, the first aperture defines a first aperture area, the inward and outward bearing surfaces of the adjustment screw define their respective inward and outward bearing areas, and each of the bearing areas is greater than the first aperture area. In another version of such embodiment, the adjustment screw has a threaded portion that has a first screw diameter which is less than the diameter of the second aperture. In such embodiment, the adjustment screw may also have a necked-down portion between the bearing surfaces.

Yet another, more specific embodiment of the apparatus includes a second guide bar having a second adjustment screw therethrough and including spaced-apart inward and outward second bearing surfaces. A second bearing member extends from the second guide bar and is interposed between the second bearing surfaces. The second bearing member includes a first aperture receiving the second adjustment screw therethrough, the first aperture of the second bearing member being lateral to the axis and having a first diameter. There is also a second aperture overlapping the first aperture of the second bearing member and having a second diameter greater than the first diameter of the first aperture of the second bearing member.

As used in this specification, the term "overlapping," used to describe the relationship of one aperture to another, means that the apertures are so positioned that they "break into" one another and form a single opening, the size and shape of which exhibits size and shape characteristics of both apertures.

DETAILED DESCRIPTIONS OF PREFERRED EMBODIMENTS

Figure 1:
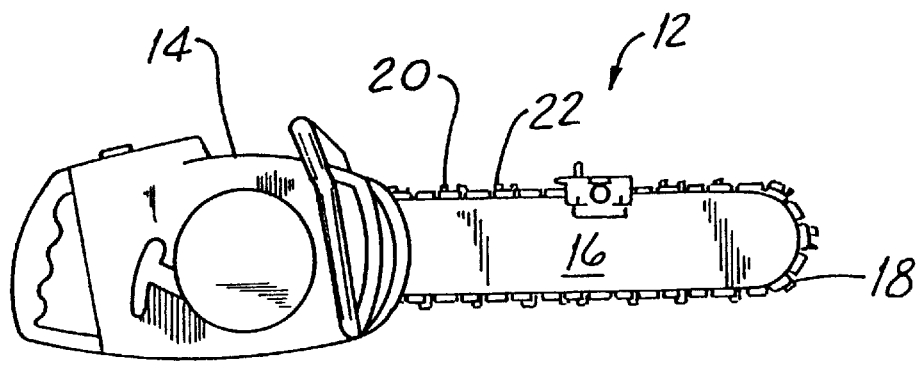
FIG. 1 is a side elevation of a conventional chain saw.

Before describing details of the new sharpening apparatus 10, it will be helpful to have a general understanding of the purpose of such apparatus 10. A small conventional chain saw 12 similar to the type used to clear dead or broken tree limbs around a farm or residential yard is shown in FIG. 1. Such chain saw 12 includes an engine and drive case 14, a cutter bar 16 and a saw chain 18 mounted thereon in the conventional fashion. The chain has left-hand teeth 20 and right-hand teeth 22 which are allochiral relative to each other and arranged alternately on opposite sides of the chain with cooperating connector links, and between guide links, so that each tooth 20, 22 comprises a working link in the chain.

The invention involves an improvement to an apparatus 10 for sharpening a chain saw 12. Such apparatus 10 is shown in FIGS. 2, 3, 4, 5, and 6. The apparatus 10 involved in the improved invention includes a frame 24, a file guide carriage 26 having at least one guide bore 28 capable of receiving a file therethrough, and a guide bar 30 attached to the frame 24. The file guide carriage 26 is mounted with respect to the frame 24 so as to allow for sliding movement along an axis A—A that has an elongate opening 32 coincident with the axis.

Figure 7:
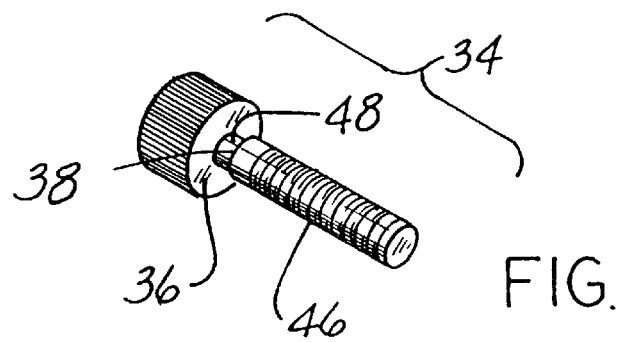
FIG. 7 is a perspective view of the improved adjustment screw showing the inward bearing surface and the necked down portion.
Figure 8:
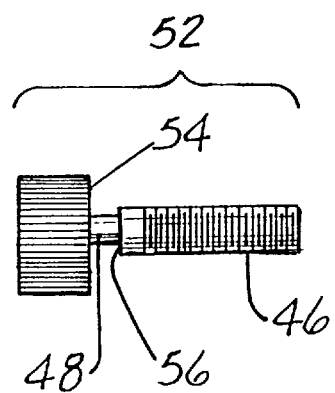
FIG. 8 is a side view of the improved adjustment screw.
Figure 2:
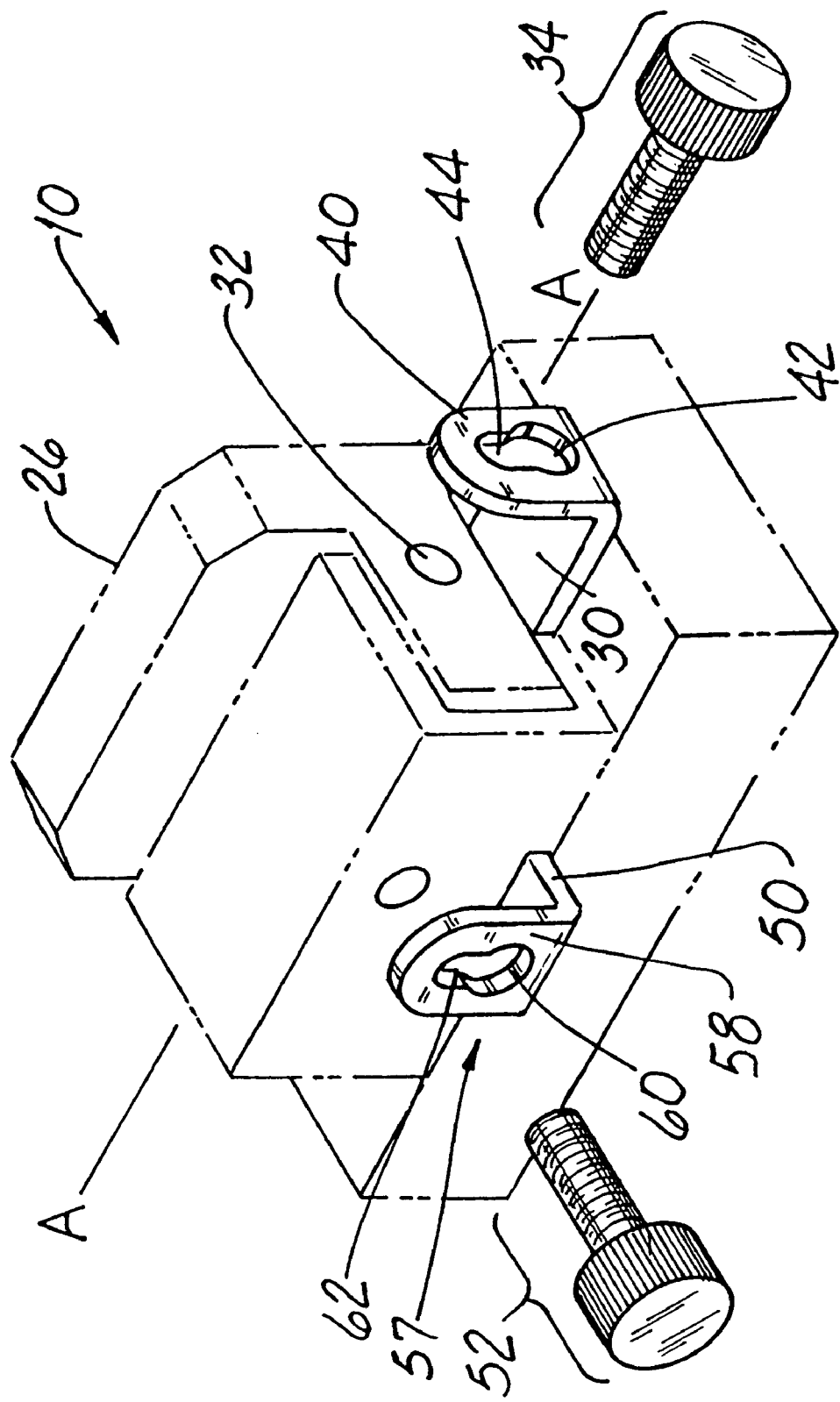
FIG. 2 is a perspective block view of the improved chain saw sharpener highlighting the improved adjustment screws, guide bar member, and apertures.
Figure 3:
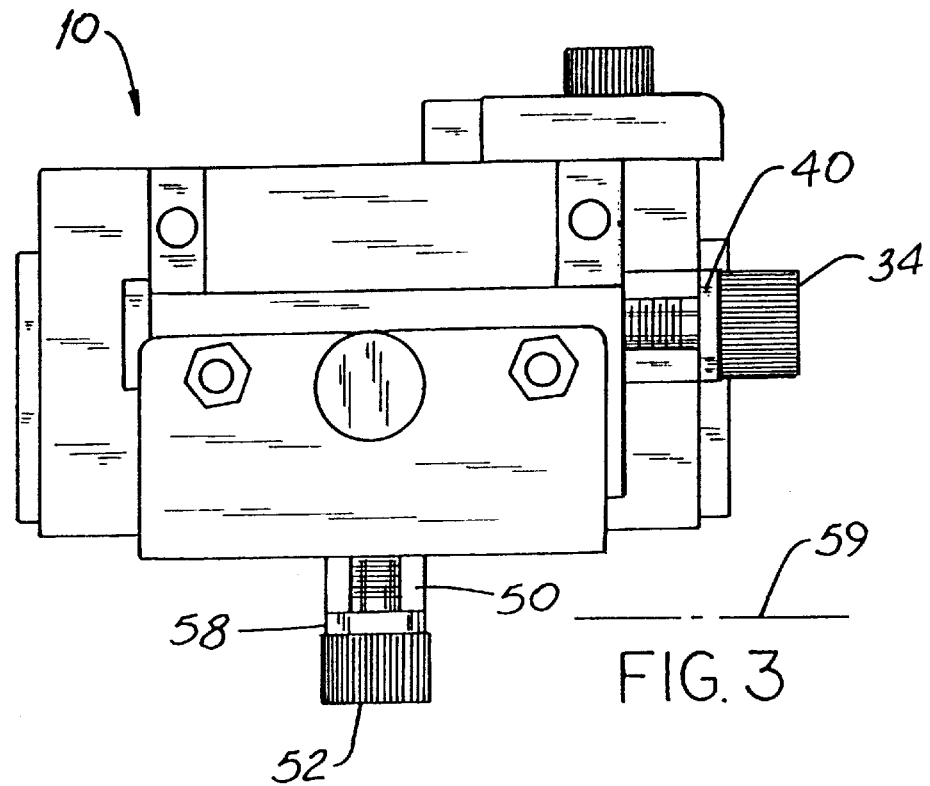
FIG. 3 is a top view of the improved chain saw sharpener.
Figure 4:
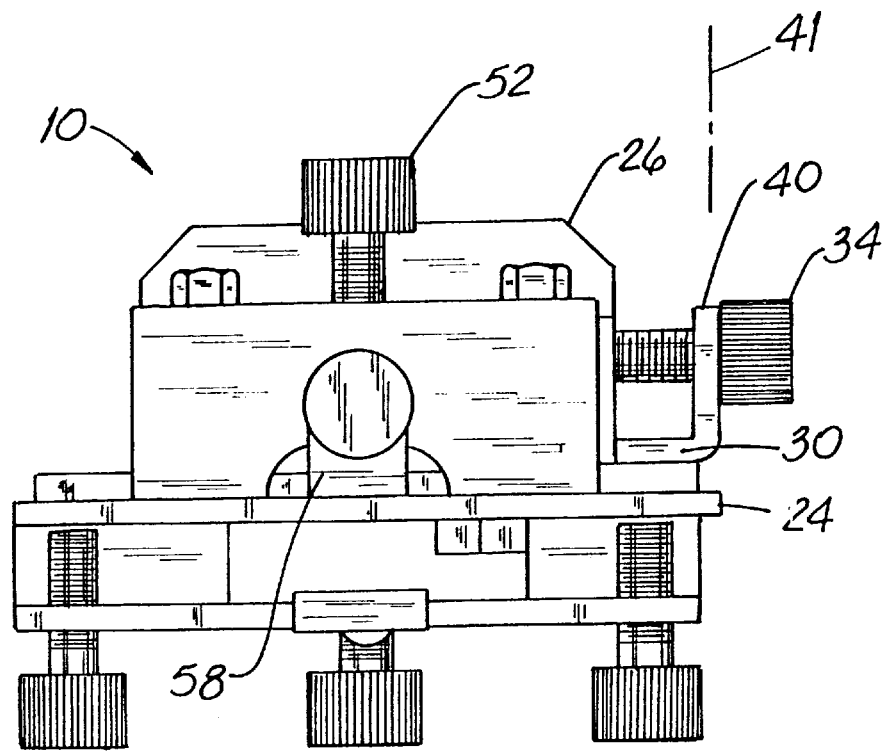
FIG. 4 is a side view of the improved chain saw sharpener.
Figure 5:
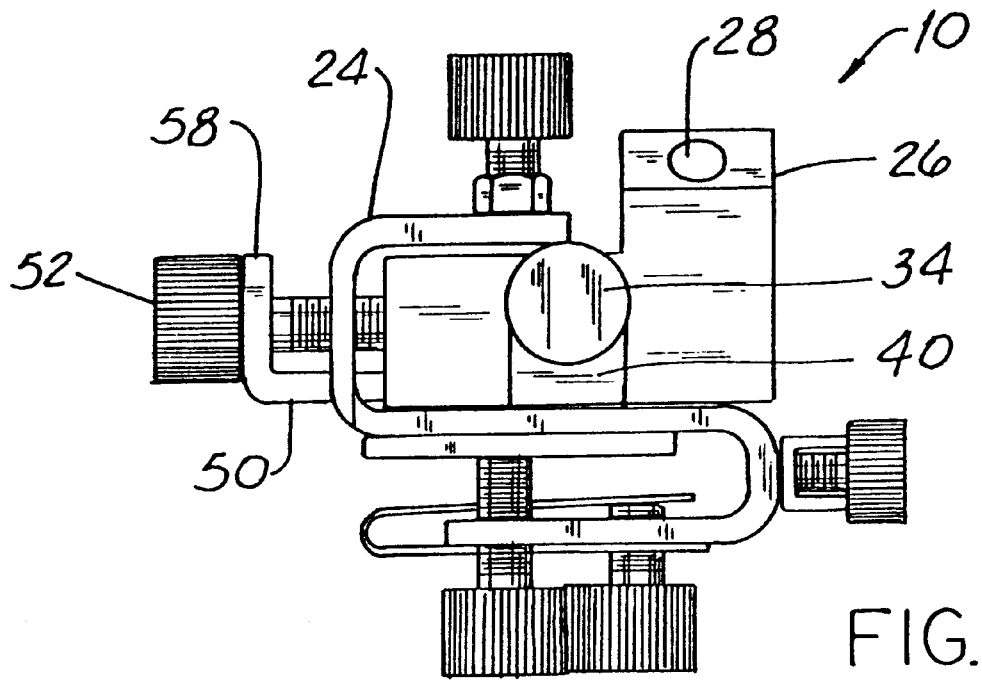
FIG. 5 is an end view of the improved chain saw sharpener showing the adjustment screw secured in the guide bar member.
Figure 6:
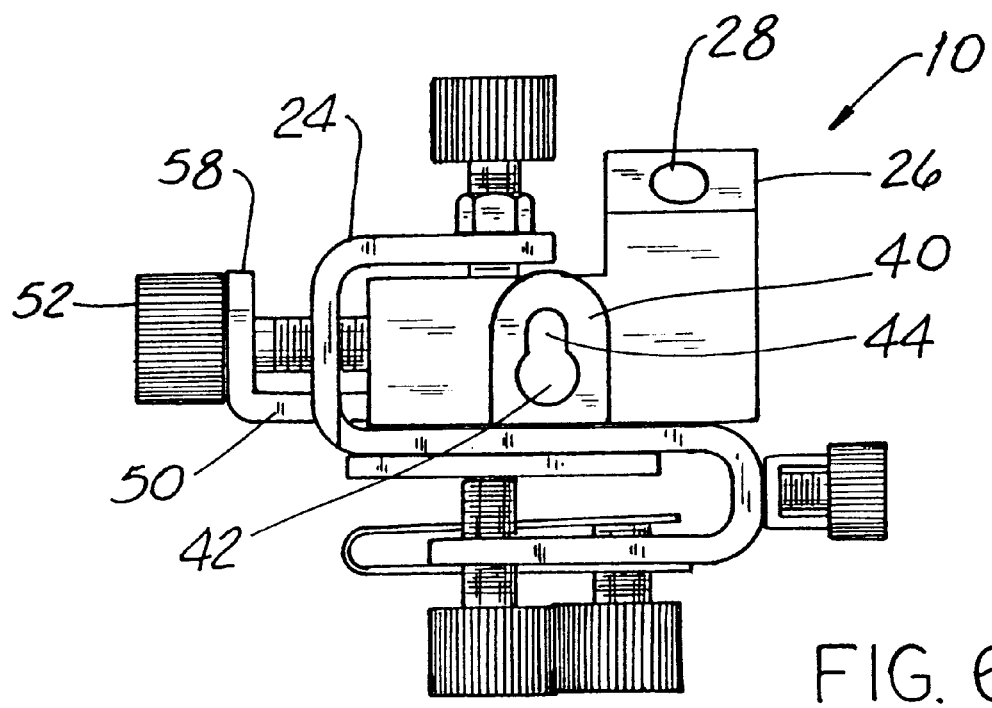
FIG. 6 is an end view of the improved chain saw sharpener with the adjustment screw removed in order to show the first and second apertures in the guide bar member.

The improvement is comprised of an easy-to-remove adjustment screw 34 as shown in FIGS. 7 and 8. Such screw 34 has spaced-apart inward and outward bearing surfaces 36, 38 and a threaded portion 46 that is threaded into the elongate opening 32. As shown in FIGS. 2, 4, 5, 6 and 9, a bearing member 40 extends from the guide bar 30 and when the screw 34 is in place for adjustment, such member 40 is interposed between the bearing surfaces 36, 38. This bearing member 40 is generally flat and coincident with a plane 41 perpendicular to the guide bar 30.

Figure 9:
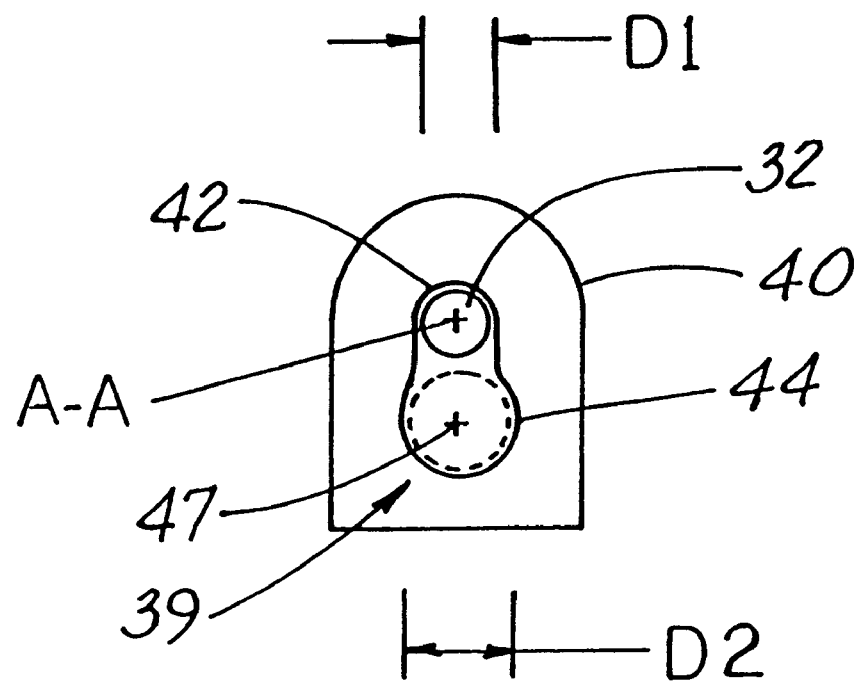
FIG. 9 is an enlarged elevation view of the bearing member of the apparatus 10. Surfaces of an adjustment screw are shown in dashed outline.
Figure 10:
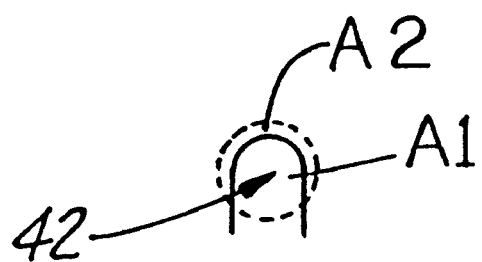
FIG. 10 is an enlarged elevation view, with parts broken away, showing certain dimensional relationships described in the specification. Surfaces of an adjustment screw are shown in dashed outline.

Referring particularly to FIG. 9, the bearing member 40 includes a key-hole-shaped opening 39 formed in part by a first aperture portion 42 aligned with the axis A—A and having a first diameter D1 selected to receive the necked-down portion 48 with slight clearance. The diameter D1 is also selected to be somewhat smaller than that of the threaded portion 46 and, of course, smaller than the head of the screw 34.

The opening 39 is also formed in part by a second aperture portion 44 which has a second diameter D2 greater than the first diameter D1. The second diameter D2 is selected to pass the threaded portion 46 therethrough with slight clearance but, preferably, prevent the head of the screw 34 from passing therethrough. Considered another way, the first aperture portion 42 is arch-shaped and the second aperture portion 44 is round.

When assembling the apparatus 10, the threaded portion 46 is inserted through the opening 39 along the axis 47 until the necked-down portion 48 is aligned with the bearing member 40. The screw 34 is then moved translationally upwardly until the portion 48 is in registry with the first aperture portion 42. Thereupon, the portion 46 is threaded into the opening 32 and may be further rotated for positional adjustment of the guide carriage 26. From the foregoing, it will now be appreciated that the shape of the opening 39 permits the adjustment screw 34 to be initially inserted in the second aperture portion 44 and retained in the first portion 42. It also allows the adjustment screw 34 to be easily removed, thereby allowing the apparatus 10 to be disassembled into its various components for ease of cleaning.

In other aspects of the invention, the first aperture portion 42 defines a first aperture area A1, the inward and outward bearing surfaces 36, 38 of the adjustment screw 34 define their respective inward and outward bearing areas A2, and each of the bearing areas A2 is greater than the first aperture area A1. It is the difference in the larger bearing areas A2 in relation to the first aperture area A1 that results in the adjustment screw 34 being axially secured within the first aperture portion 42 when the threaded portion 46 is aligned with the axis A—A and such portion 46 is threaded into the opening 32.

Referring to FIGS. 2, 3, 4, 5, and 6, yet another, more specific embodiment of the apparatus 10 includes a second guide bar 50 having a second adjustment screw 52 through it. The screw 52 has spaced-apart inward and outward second bearing surfaces 54, 56.

A second bearing member 58 extends from the second guide bar 50 and is interposed between the second bearing surfaces 54, 56. Such bearing member 58 is coincident with a plane 59 perpendicular to the second guide bar 50 and perpendicular to the plane 41. The member 58 also has a key-hole-shaped opening 57 formed in part by a first aperture portion 60 receiving the second adjustment screw 52 therethrough. The first aperture portion 60 of the second bearing member 58 is lateral to the axis A—A and has a first diameter. The opening 57 is also formed in part by a second aperture portion 62 overlapping the first aperture portion 60 of the second bearing member 58 and having a second diameter greater than the first diameter of the first aperture portion 60 of the second bearing member 58. In a highly preferred embodiment, the openings 39, 57 are substantially identical to one another. Of course, that means that the first diameter of the aperture portion 60 is substantially identical to diameter D1 and the second diameter of the second aperture portion 62 is substantially equal to diameter D2. Similarly, the adjustment screw 52 is configured to be substantially identical to adjustment screw 34.

The inventive sharpener is used in the matter described in U.S. Pat. No. 3,744,349 (Junker) which is incorporated herein by reference.

As used herein to describe movement of the screw 34, the term "translationally" means movement in such a manner that all lines in the screw 34 remain parallel to their original positions. Such definition is consistent with the meaning of the term in the field of engineering mechanics.

While the principles of the invention have been shown and described in connection with but a few embodiments, it is to be understood clearly that such embodiments are by way of example and are not limiting.

What is claimed:

1. In an apparatus for sharpening a chain saw and including (a) a frame, (b) a file guide carriage having at least one guide bore for receiving a file therethrough, the carriage being mounted with respect to the frame for sliding movement along an axis and having an elongate opening coincident with the axis, and (c) a guide bar attached to the frame, the improvement comprising:

an adjustment screw threaded into the opening and including spaced-apart inward and outward bearing surfaces;
a bearing member extending from the guide bar and being interposed between the bearing surfaces;
and wherein the bearing member includes:
a first aperture receiving the adjustment screw therethrough, the first aperture being aligned with the axis and having a first diameter; and
a second aperture overlapping the first aperture and having a second diameter greater than the first diameter.

2. The apparatus of claim 1 wherein:
the first aperture defines a first aperture area;
the inward and outward bearing surfaces define inward and outward bearing areas, respectively; and
each of the bearing areas is greater than the first aperture area.

3. The apparatus of claim 1 wherein:
the adjustment screw has a threaded portion having a first screw diameter; and
the first screw diameter is less than the second diameter.

4. The apparatus of claim 1 wherein the adjustment screw has a necked-down portion between the bearing surfaces.

5. The apparatus of claim 1 wherein:

the guide bar is a first guide bar;

the bearing member is a first bearing member;

the adjustment screw is a first adjustment screw;

the bearing surfaces are first bearing surfaces;

and wherein the apparatus includes:

a second guide bar having a second adjustment screw therethrough and including spaced-apart inward and outward second bearing surfaces;

a second bearing member extending from the second guide bar and being interposed between the second bearing surfaces;

and wherein the second bearing member includes:

a first aperture receiving the second adjustment screw therethrough, the first aperture of the second bearing member being lateral to the axis and having a first diameter; and a second aperture overlapping the first aperture of the second bearing member and having a second diameter greater than the first diameter of the first aperture of the second bearing member.

6. The apparatus of claim 5 wherein:

the first aperture of the second bearing member defines a first aperture area;

the inward and outward second bearing surfaces define inward and outward bearing areas, respectively; and each of the second bearing areas is greater than the first aperture area of the first aperture of the second bearing member.

7. The apparatus of claim 5 wherein:

the second adjustment screw has a threaded portion having a first screw diameter; and the first screw diameter of the second adjustment screw is less than the second diameter of the second bearing area.

8. The apparatus of claim 5 wherein the second adjustment screw has a necked-down portion between the second bearing surfaces.

\* \* \* \* \*